US007833094B2

(12) United States Patent
Englman et al.

(10) Patent No.: US 7,833,094 B2
(45) Date of Patent: Nov. 16, 2010

(54) WAGERING GAME WITH COMMUNITY AWARD BASED ON BEST SELECTION FROM ALL PLAYERS

(75) Inventors: Allon G. Englman, Chicago, IL (US); Michael W. Mastropietro, Chicago, IL (US); Larry J. Pacey, Northbrook, IL (US)

(73) Assignee: WMS Gaming Inc., Waukegan, IL (US)

(*) Notice: Subject to any disclaimer, the term of this patent is extended or adjusted under 35 U.S.C. 154(b) by 598 days.

(21) Appl. No.: 11/445,982

(22) Filed: Jun. 1, 2006

(65) Prior Publication Data

US 2006/0287043 A1 Dec. 21, 2006

Related U.S. Application Data

(60) Provisional application No. 60/687,723, filed on Jun. 6, 2005.

(51) Int. Cl.

*A63F 9/24* (2006.01)
*A63F 13/00* (2006.01)
*G06F 17/00* (2006.01)
*G06F 19/00* (2006.01)

(52) U.S. Cl. .......... 463/25; 463/16; 463/20; 463/42

(58) Field of Classification Search .......... 463/25, 463/42, 16, 20

See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A | 6/1989 | Barrie et al. | 364/412 |
| 4,948,134 | A | 8/1990 | Suttle et al. | 273/85 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 273/85 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 CP |
| 5,393,057 | A | 2/1995 | Marnell, II | 273/85 CP |
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,655,961 | A | 8/1997 | Acres et al. | 463/27 |
| 5,766,076 | A | 6/1998 | Pease et al. | 463/27 |

(Continued)

FOREIGN PATENT DOCUMENTS

CA 2334546 A1 8/2001

(Continued)

OTHER PUBLICATIONS

Article for "Easy Riches" by Sigma Game, Strictly Slots, 1 page (Aug. 2001).

(Continued)

*Primary Examiner*—Dmitry Suhol
*Assistant Examiner*—Wei Li
(74) *Attorney, Agent, or Firm*—Nixon Peabody LLP

(57) ABSTRACT

A gaming system for conducting a community game at linked gaming machines includes a best selection feature that allows players to make selections from a plurality of selectable objects. Each selected object is associated with an award and the highest award is awarded to each of the players at the linked gaming machines.

17 Claims, 13 Drawing Sheets

U.S. PATENT DOCUMENTS

| | | | | |
|---|---|---|---|---|
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,823,874 | A | 10/1998 | Adams | 463/17 |
| 5,830,063 | A | 11/1998 | Byrne | 463/18 |
| 5,833,536 | A * | 11/1998 | Davids et al. | 463/11 |
| 5,848,932 | A * | 12/1998 | Adams | 463/20 |
| 5,855,515 | A | 1/1999 | Pease et al. | 463/27 |
| 5,876,284 | A | 3/1999 | Acres et al. | 463/25 |
| 5,882,258 | A * | 3/1999 | Kelly et al. | 463/11 |
| 5,885,158 | A | 3/1999 | Torango et al. | 463/27 |
| 5,941,773 | A | 8/1999 | Harlick | 463/26 |
| 5,975,528 | A | 11/1999 | Halaby | 273/148 |
| 6,007,427 | A | 12/1999 | Wiener et al. | 463/17 |
| 6,012,982 | A | 1/2000 | Piechowiak et al. | 463/16 |
| 6,039,648 | A | 3/2000 | Guinn et al. | 463/16 |
| 6,047,963 | A | 4/2000 | Pierce et al. | 273/121 B |
| 6,077,162 | A | 6/2000 | Weiss | 463/26 |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,798 | A | 8/2000 | Bennett | 463/16 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,484 | B1 | 5/2001 | Okuda et al. | 463/27 |
| 6,231,445 | B1 | 5/2001 | Acres | 463/42 |
| 6,254,483 | B1 | 7/2001 | Acres | 463/26 |
| 6,312,232 | B1 | 11/2001 | Mori et al. | 417/297 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,358,149 | B1 | 3/2002 | Schneider et al. | 463/27 |
| 6,361,441 | B1 * | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,408 | B2 | 7/2002 | Tracy et al. | 463/16 |
| 6,416,409 | B1 | 7/2002 | Jordan | 463/27 |
| 6,422,940 | B1 | 7/2002 | Walker et al. | 463/13 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,589,115 | B2 | 7/2003 | Walker et al. | 463/25 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,609,973 | B1 | 8/2003 | Weiss | 463/20 |
| 6,632,141 | B2 * | 10/2003 | Webb et al. | 463/25 |
| 6,648,753 | B1 | 11/2003 | Tracy et al. | 463/16 |
| 6,648,762 | B2 | 11/2003 | Walker et al. | 463/25 |
| 6,685,560 | B1 | 2/2004 | Hughes | 463/16 |
| 6,692,354 | B2 | 2/2004 | Tracy et al. | 463/16 |
| 6,712,695 | B2 | 3/2004 | Mothwurf et al. | 463/25 |
| 6,712,699 | B2 | 3/2004 | Walker et al. | 463/30 |
| 6,712,702 | B2 * | 3/2004 | Goldberg et al. | 463/42 |
| 6,733,390 | B2 | 5/2004 | Walker et al. | 463/23 |
| 6,790,141 | B2 | 9/2004 | Muir | 463/42 |
| 6,837,793 | B2 | 1/2005 | McClintic | 463/42 |
| 6,852,027 | B2 * | 2/2005 | Kaminkow et al. | 463/16 |
| 6,869,361 | B2 | 3/2005 | Sharpless et al. | 463/25 |
| 6,887,159 | B2 | 5/2005 | Leen et al. | 463/42 |
| 6,942,567 | B2 * | 9/2005 | Baerlocher et al. | 463/16 |
| 7,278,919 | B2 * | 10/2007 | Souza et al. | 463/25 |
| 7,300,348 | B2 * | 11/2007 | Kaminkow et al. | 463/17 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0027618 | A1 | 2/2003 | Byrne | 463/16 |
| 2003/0036430 | A1 | 2/2003 | Cannon | 463/42 |
| 2003/0045337 | A1 | 3/2003 | Byrne | 463/16 |
| 2003/0047874 | A1 | 3/2003 | Leen | 273/292 |
| 2003/0050106 | A1 | 3/2003 | Lyfoung | 463/13 |
| 2003/0064776 | A1 | 4/2003 | Byrne | 463/16 |
| 2003/0064807 | A1 | 4/2003 | Walker et al. | 463/42 |
| 2003/0078093 | A1 * | 4/2003 | Simms et al. | 463/20 |
| 2003/0114218 | A1 | 6/2003 | McClintic | 463/25 |
| 2003/0119576 | A1 | 6/2003 | McClintic | 463/20 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0216166 | A1 | 11/2003 | Baerlocher et al. | 463/20 |
| 2003/0222402 | A1 | 12/2003 | Olive | 273/292 |
| 2003/0224852 | A1 | 12/2003 | Walker et al. | 463/20 |
| 2003/0228899 | A1 | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0038741 | A1 | 2/2004 | Gauselmann | 463/42 |
| 2004/0048644 | A1 | 3/2004 | Gerrard et al. | 463/16 |
| 2004/0087368 | A1 | 5/2004 | Gauselmann | 463/42 |
| 2004/0106448 | A1 * | 6/2004 | Gauselmann | 463/25 |
| 2004/0132524 | A1 | 7/2004 | Ramstad et al. | 463/16 |
| 2004/0204226 | A1 | 10/2004 | Foster et al. | 463/20 |
| 2004/0204235 | A1 | 10/2004 | Walker et al. | 463/29 |
| 2004/0235552 | A1 | 11/2004 | Gauselmann | 463/16 |
| 2004/0242297 | A1 | 12/2004 | Walker et al. | 463/13 |
| 2004/0242303 | A1 | 12/2004 | Walker et al. | 463/16 |
| 2005/0014554 | A1 * | 1/2005 | Walker et al. | 463/20 |
| 2005/0026674 | A1 | 2/2005 | Wolf et al. | 463/16 |
| 2005/0148382 | A1 | 7/2005 | Fox | 463/19 |
| 2005/0164793 | A1 * | 7/2005 | Merimovich et al. | 463/42 |
| 2005/0187008 | A1 | 8/2005 | Nakajima | 463/20 |
| 2005/0192073 | A1 | 9/2005 | Nakajima | 463/16 |
| 2005/0282603 | A1 * | 12/2005 | Parrott et al. | 463/1 |
| 2005/0282628 | A1 | 12/2005 | Beatty et al. | 463/27 |

FOREIGN PATENT DOCUMENTS

| | | | |
|---|---|---|---|
| DE | 195 15 983 | A1 | 11/1996 |
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |

WO WO 03/083789 A1 10/2003

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

* cited by examiner

WAGERING GAME WITH COMMUNITY AWARD BASED ON BEST SELECTION FROM ALL PLAYERS

CROSS REFERENCE TO RELATED APPLICATION

This application claims the benefit of priority of U.S. Provisional Patent Application No. 60/687,723, filed Jun. 6, 2005, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a system of linked gaming machines having a best-selection feature for awarding all players an award associated with the best selection made by any individual player.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Other wagering games involve engaging multiple players to enter a shared, or community, wagering game wherein multiple gaming machines are linked together to play a shared basic or bonus game. As the interest and demand for these types of community games increases, there is also a continuing need to develop new features for these games that enhance the gaming experience.

SUMMARY OF THE INVENTION

According to one aspect of the present invention, a gaming system for playing a community game includes a plurality of linked gaming machines that are operable to receive wagers from players. Each machine includes a display for displaying a plurality of objects. Each of the plurality of objects is associated with an award. Upon selection of at least one of the objects at the plurality of linked gaming machines, the highest award associated with the selected objects is awarded to each of the gaming machines.

According to another aspect of the invention, a method of conducting a community game via a plurality of linked gaming machine is disclosed. The linked gaming machines are operable to receive wagers from players. The method includes the steps of displaying a plurality of selectable objects at each of the linked gaming machines, selecting at least one of the plurality of selectable objects at each of the linked gaming machines, wherein each of the selected objects are associated with respective awards, and awarding a highest award among the respective awards to each of the linked gaming machines.

According to yet another aspect of the invention, a computer readable storage medium is encoded with instructions for directing the gaming machines to perform the above method.

According to yet another aspect of the invention, a gaming system for playing a community game includes a plurality of linked gaming machines and a controller coupled to the plurality of linked gaming machines. The controller is operative to receive a special-event-triggering signal associated with a special event in response to a special-event outcome being achieved and transmit a special-event-play signal to the plurality of linked gaming machines to allow players at the plurality of linked gaming machines to obtain an object from a plurality of objects, wherein each of the plurality of objects is associated with an award. The controller is also operative to determine which of the obtained objects is associated with an award that is better than the least favorable award obtained and award the better award to each of the players at the plurality of linked gaming machines.

Additional aspects of the invention will be apparent to those of ordinary skill in the art in view of the detailed description of various embodiments, which is made with reference to the drawings, a brief description of which is provided below.

DETAILED DESCRIPTION

Figure 1:
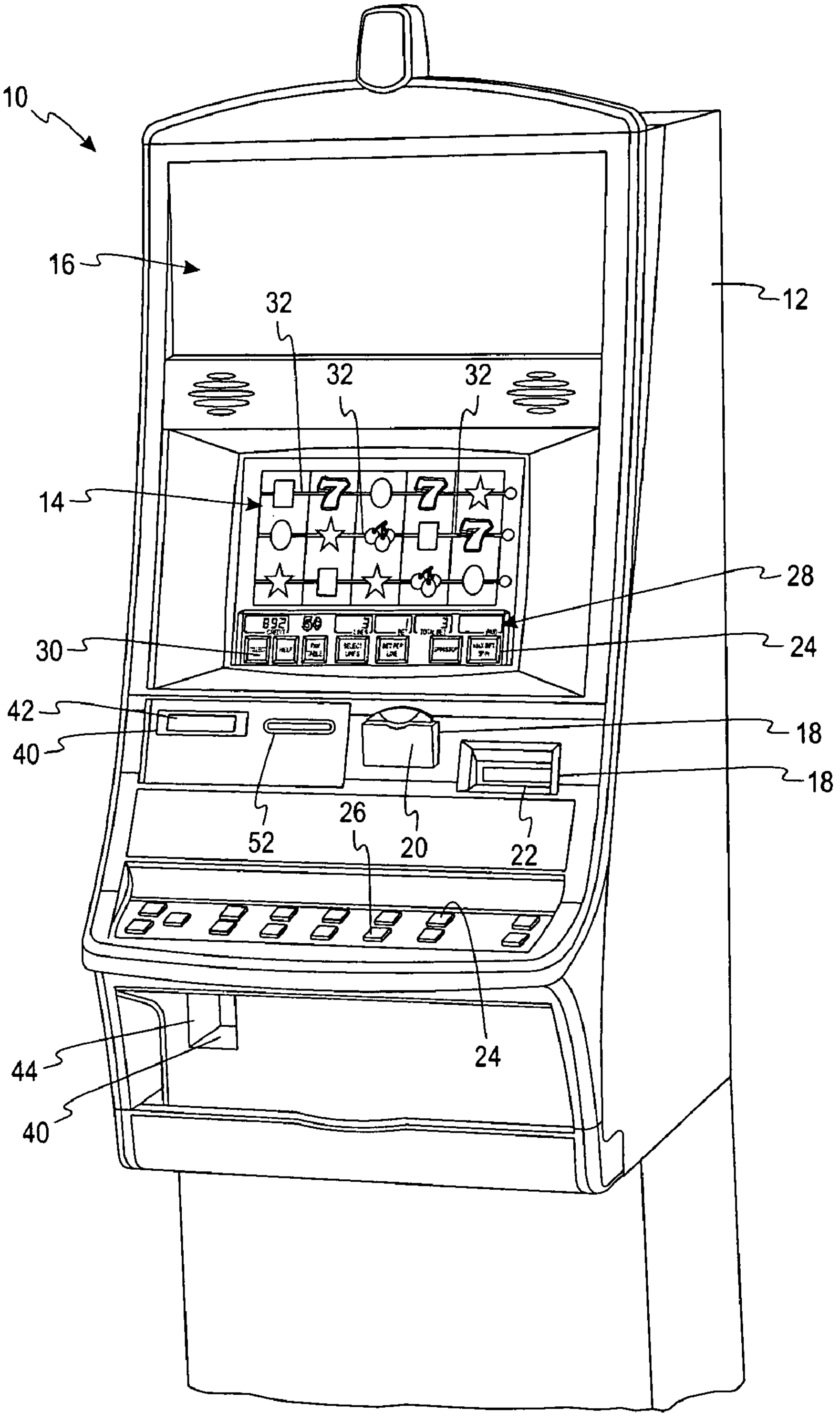
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game. The plurality of randomly-selected outcomes may also include a special-event outcome that triggers the start of a community, or shared, wagering game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
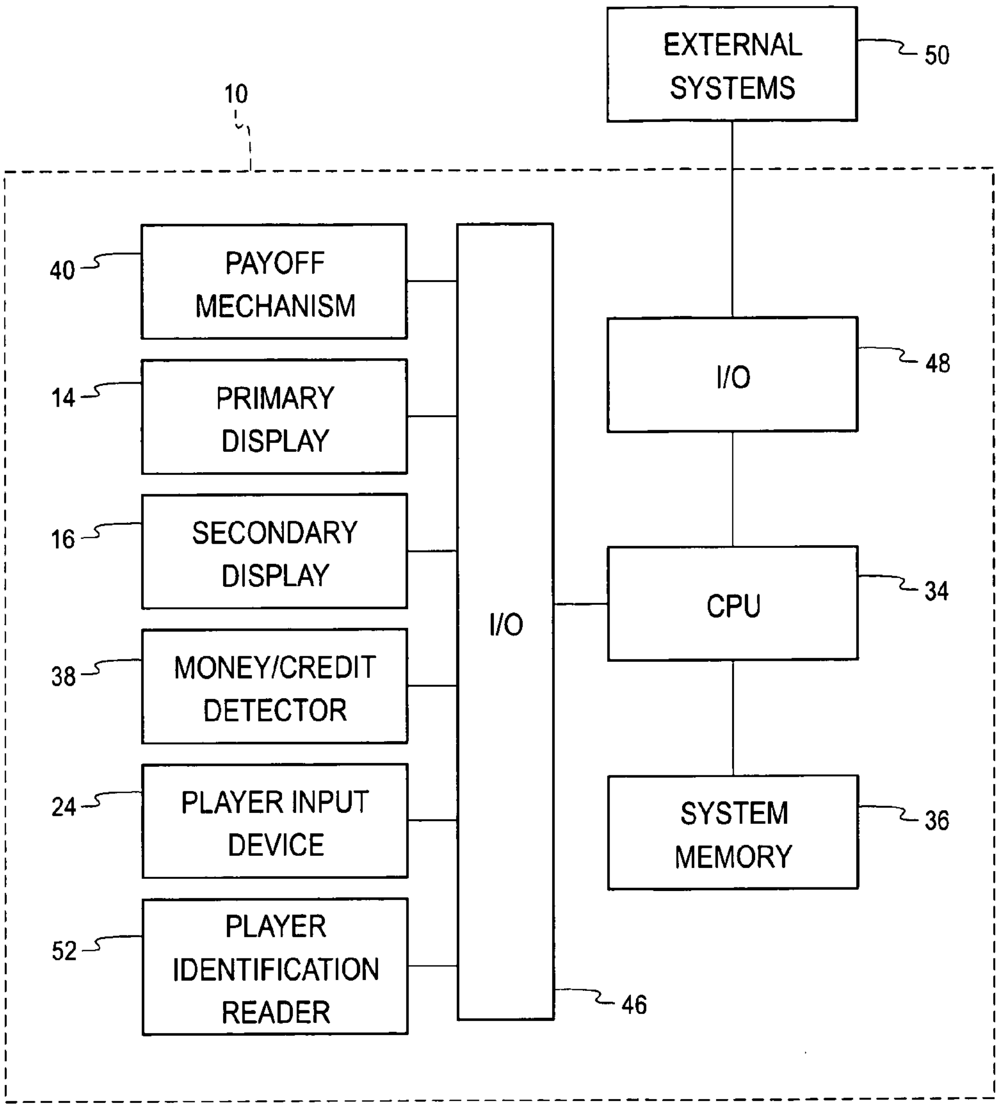
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
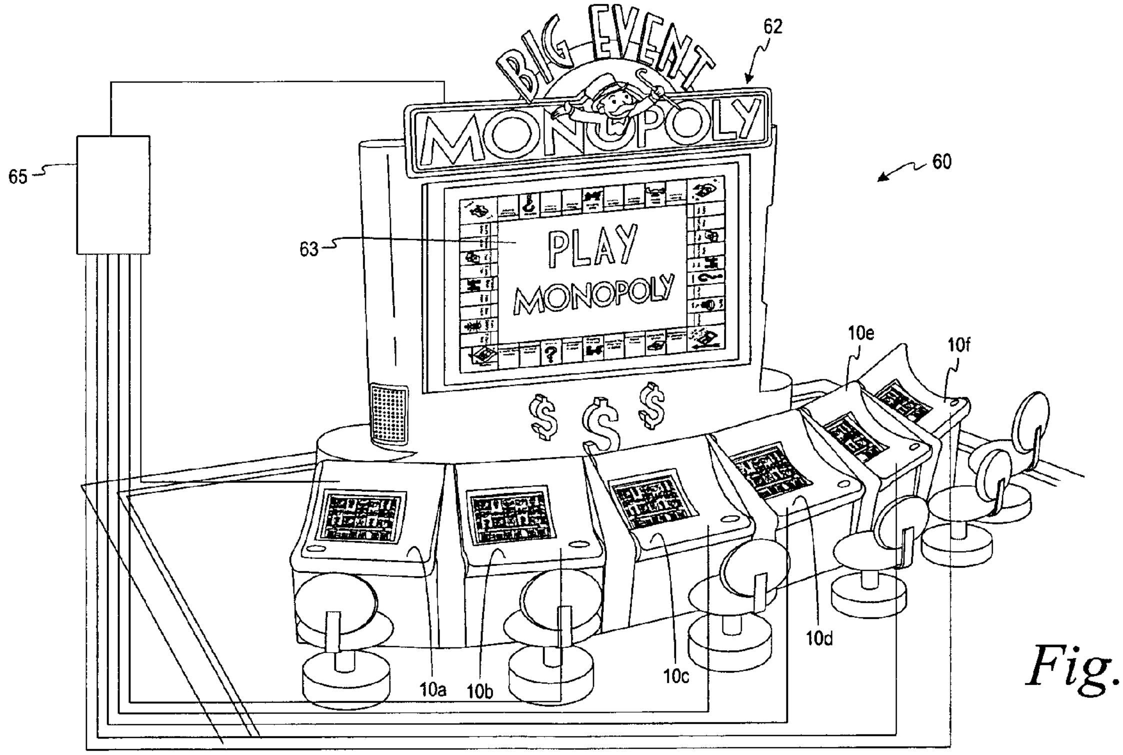
FIG. 3 is a perspective view of a system of linked gaming machines according to one embodiment of the present invention.

While the gaming machine 10 of FIGS. 1 and 2 has been described with respect to a single wagering game providing a basic game and a bonus game, the gaming machine 10 may be connected, or linked, to other gaming machines for playing a community wagering game. According to one embodiment depicted in FIG. 3, a gaming system 60 of linked gaming machines 10*a*, 10*b*, 10*c*, 10*d*, 10*e*, 10*f* is shown. The gaming machines 10*a*, 10*b*, 10*c*, 10*d*, 10*e*, 10*f* are of the type described above in relation to FIGS. 1 and 2. The gaming machines 10*a-f* are interconnected and may display the same or different wagering game. The gaming machines 10*a-f* are included under signage 62 that includes a game screen 63, or other community display, for displaying a wagering game which, in this embodiment, is the BIG EVENT MONOPOLY™ game. The game screen 63 is able to be viewed by all players at the gaming machines 10*a-f*. The gaming system 60 includes a controller 65 for assisting in the control of, or completely controlling, a special event. While six linked gaming machines are shown in FIG. 3, it is contemplated that more or less gaming machines can be linked together in the gaming system 60 and that the gaming machines may be remote from each other. Each of the gaming machines 10*a-f* may also display the special event on the primary display 14 and/or secondary display 16.

In this embodiment of FIG. 3, the signage 62 and controller 65 can be part of the external system 50 in FIG. 2. The controller 65 is coupled to the controller 34 (FIG. 2) of each of the gaming machines 10*a-f* and the controller 34 transmits information to and receives information from the controller 65. In one embodiment, the controller 34 receives a special-event-triggering signal associated with a special event in response to a special-event outcome that is achieved by at least one of the linked gaming machines 10*a-f*. The controller 65 then transmits a special-event-play signal to the linked gaming machines 10*a-f*. The special-event-play signal may initiate play of a community wagering game.

The community wagering game that is displayed to players on the linked gaming machines 10*a*, 10*b*, 10*c*, 10*d*, 10*e*, 10*f* and the game screen 63 may include features not available to players playing on non-linked gaming machines. For example, and as described herein in the present invention, a community wagering game can include a best selection feature that allows players at linked gaming machines to select objects that are associated with awards. After each player has selected an object, the highest award from all selected objects is then awarded to each of the players. Alternatively, instead of receiving the highest award, players may receive an award that is better than the least favorable award. This "better" award may include the highest award or an award that lies somewhere between the highest award and the lowest award.

The special-event outcome that is associated with the best selection feature can be randomly triggered by the community controller 65 which may perform the random selection of the special-event outcome for the linked gaming machines 10_a-f_. Alternatively, the special-event outcome may be randomly triggered by an outcome at any of the individual gaming machines 10_a-f_ upon achieving, for example, a start-special-event outcome. In yet another alternative, the gaming machines only display the special-event outcome, displayed as the community wagering game, such that the gaming machines do not have their own separate wagering games (and therefore there is no triggering outcome in a basic game).

To show how the best selection feature may be used in a wagering game, one embodiment is described in more detail in the following paragraphs. However, this description is not meant to limit the use of the best selection feature to this particular embodiment as it can be used in other community wagering games. In the embodiment shown in FIGS. 4-12, the BIG EVENT MONOPOLY™ game is displayed on the linked gaming machines 10_a-f_ and on signage 62. The BIG EVENT MONOPOLY™ game includes individual wagering games played on each of the linked gaming machines 10_a-f_ and a community bonus game that is displayed on the game screen 63. When the bonus game is triggered, i.e., by a special event outcome, all eligible players at the linked gaming machines 10_a-f_ may participate in the bonus game. Eligibility requirements may include (1) playing a wagering game at a gaming machine 10_a_ to 10_f_, (2) wagering at a certain level, (3) achieving a certain player status, etc. Eligibility requirements, however, are not necessary for the present invention.

Figure 4:
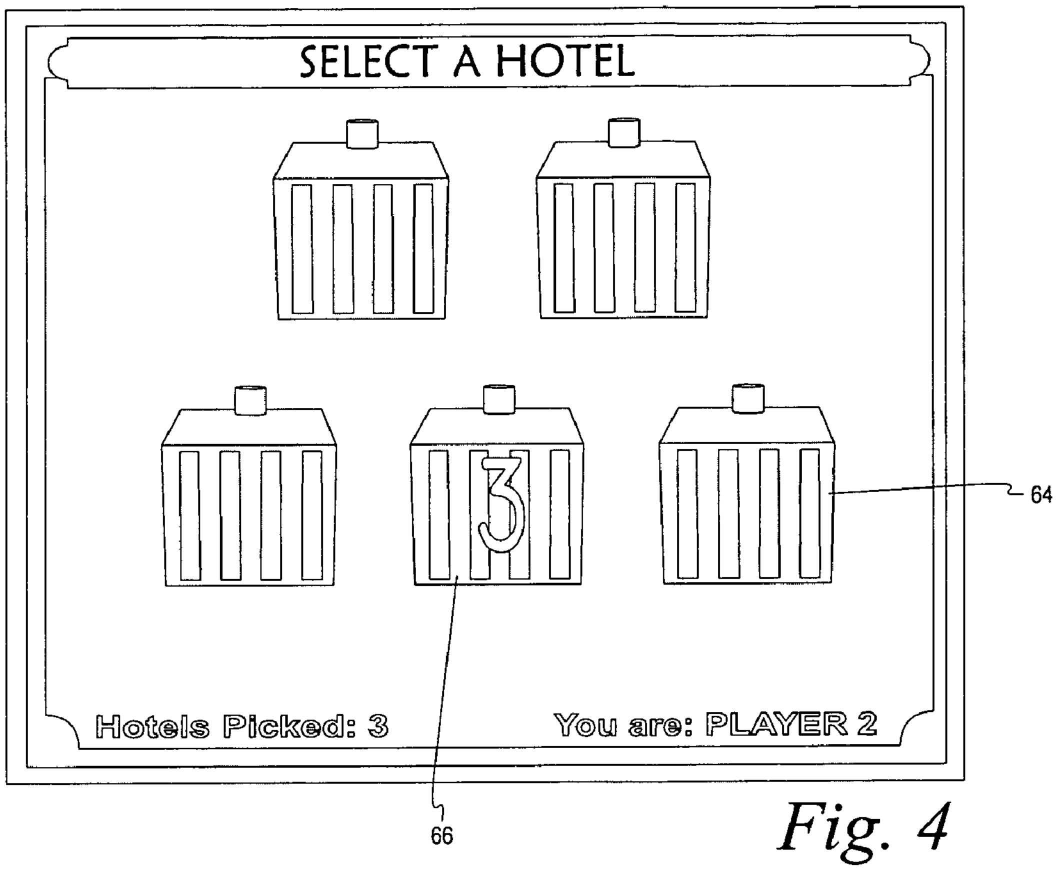
FIG. 4 is a view of a display displaying a plurality of selectable objects according to one embodiment of the present invention.
Figure 5:
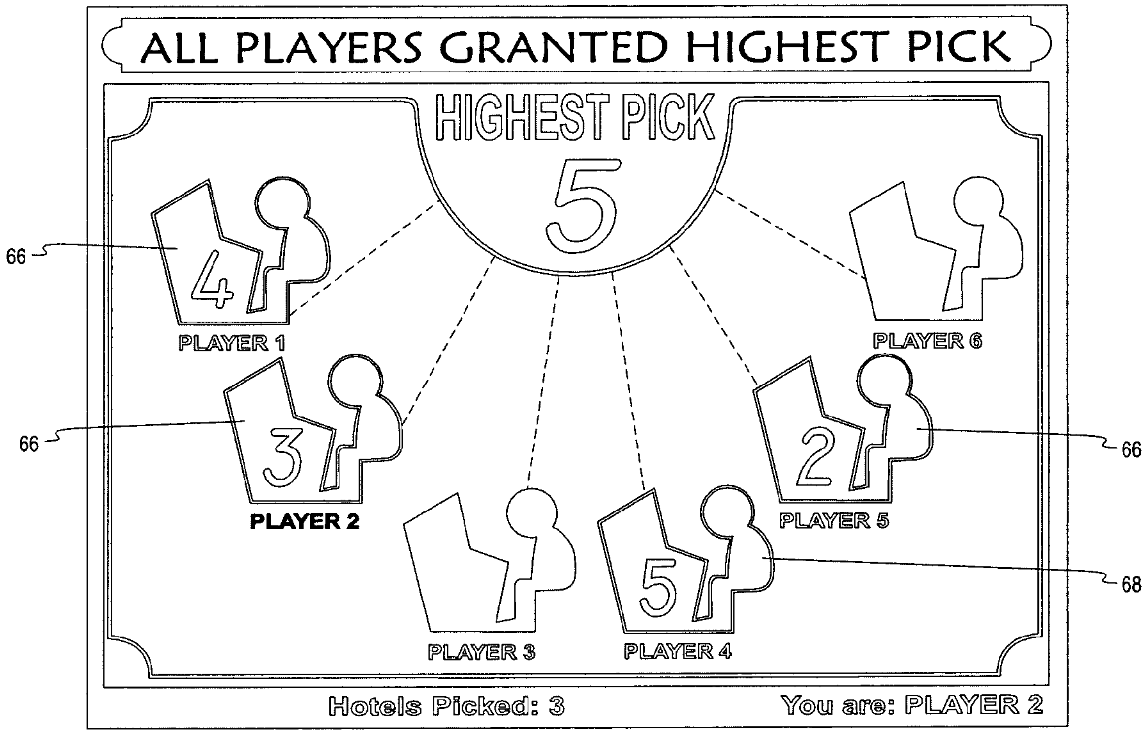
FIG. 5 is a view of a display displaying a best selection feature according to one embodiment of the present invention.

At the start of the bonus game, all eligible players are allowed to select from a plurality of selectable objects. Each selectable object is associated with an award. The awards associated with the respective selectable objects are preferably assigned to the objects prior to selection, but may alternatively be assigned to the objects after selection, i.e., "on the fly." The selectable objects may include any type of object, such as a card, figure, symbol, etc. In accordance with the BIG EVENT MONOPOLY™ game, the selectable objects may include hotels, houses or other MONOPOLY™ game-related objects. As shown in FIG. 4, the selectable objects 64, in this case "hotels", may be displayed to players on the individual linked gaming machines 10_a-f_ or on the game screen 63. As players make their selections, the awards 66 associated with the selected objects are revealed. For example, Player 2 made a selection that is associated with an award of three hotels. Similarly, as shown in FIG. 5, other players playing on the linked gaming machines 10_a-f_ select other objects having awards 66 associated with them. Each player preferable selects a single object 64 displayed on his/her gaming machine, but may alternatively be prompted to select multiple objects 64. The awards associated with any unselected objects may also be revealed so that the players can view what they would have been awarded had they made different selections. In accordance with the best selection feature of the present invention, the highest award 68 selected by any of the players is awarded to all of the players at the linked gaming machines 10_a-f_. In the example of the best selection feature illustrated in FIG. 5, all players receive five "hotels" to place on MONOPOLY™ properties.

Figure 6:
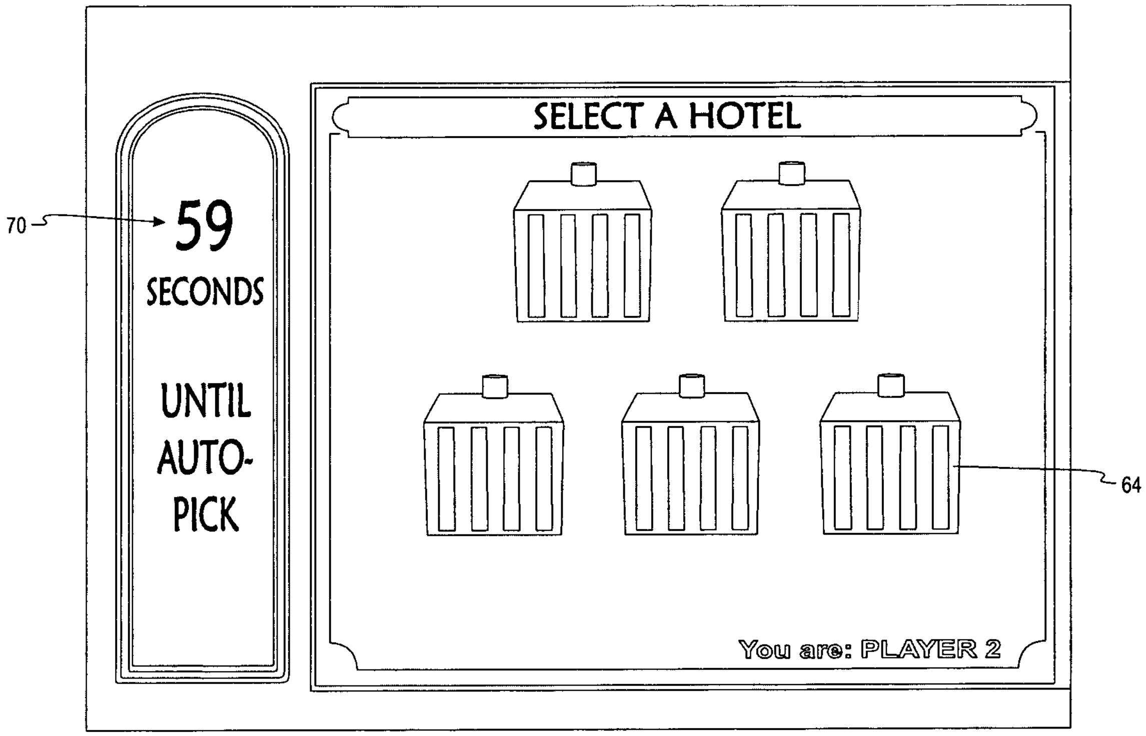
FIG. 6 is a view of a display displaying an auto-pick feature according to one embodiment of the present invention.

In some wagering games, the best selection feature may be accompanied by other features that relate to the selection of selectable objects. As in the best selection feature, the selections are responsive to player input. One such feature is an "auto-pick" feature as shown in FIG. 6. With this feature, each player at the linked gaming machines 10_a-f_ has a set amount of time displayed by a time meter 70 to perform any interaction, such as selecting one of the selectable objects 64. For example, players may be given 60 seconds to make a selection. The time meter 70 continues to count down until the player makes a selection. If the time runs out before a player has made a selection, a selection is automatically made for that player.

Figure 7:
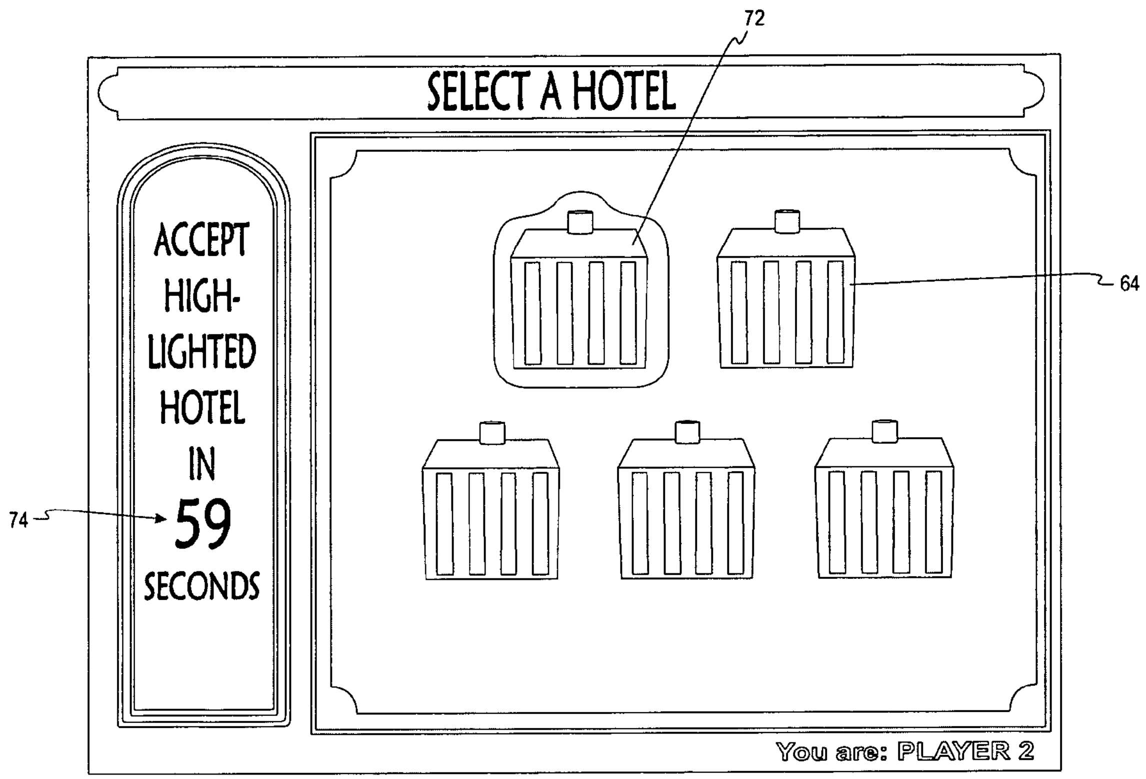
FIG. 7 is a view of a display displaying a pre-set pick feature according to one embodiment of the present invention.

Another feature that may be employed in a community wagering game is a "pre-set pick" feature that is illustrated in FIG. 7. According to this feature, one of the selectable objects 64 is randomly selected by the CPU at the start of the wagering game. The pre-selected object 72 is highlighted to indicate that this object is the pre-selected object 72. As shown in FIG. 7, a player has a set amount of time displayed via a time meter 74, i.e., 59 seconds, to accept the pre-selected object 72 or choose another object. If the time runs out and the player has not made any selection, then the pre-selected object 72 is automatically selected for the player.

Figure 8:
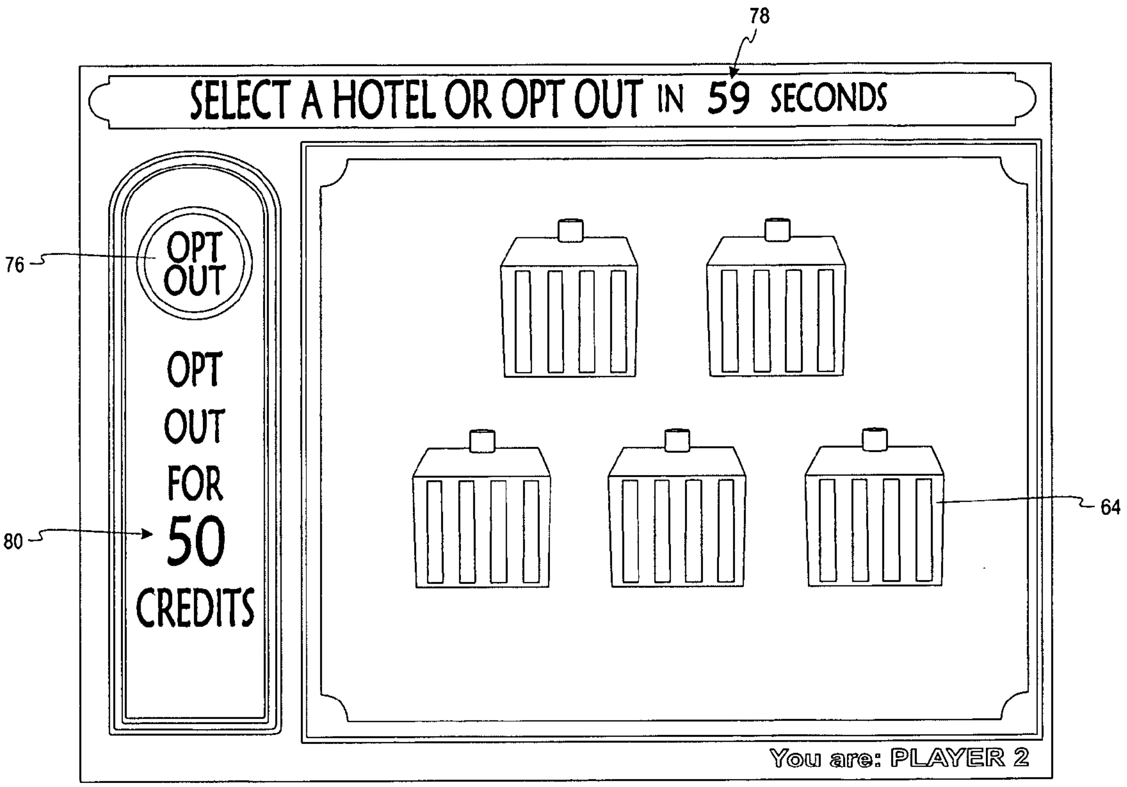
FIG. 8 is a view of a display displaying an opt-out feature according to one embodiment of the present invention.

Yet another feature that may be included in a community wagering game, as illustrated in FIG. 8, employs an opt-out option 76 that allows a player to "opt out" of the special event, i.e., bonus game, in exchange for an outcome or award 80 that is usually known to the player before opting out. In some embodiments, the award may not be known to the player before opting out. With this feature, as shown in FIG. 8, a player has a set amount of time displayed via a time meter 78 to choose the opt-out option 76 and receive an award 80, i.e., 50 credits. In some embodiments, if the time meter 78 runs out, the player is automatically opted out of the community or bonus game. In other embodiments, if the time runs out, the auto-pick or pre-set pick features may come into play and automatically make a selection for a player.

The features described above, in particular the auto-pick, pre-set pick, and opt-out options, may also be employed in individual gaming machines that are not-linked to other gaming terminals. In particular, the pre-set pick feature may be advantageous when dealing with regulations about "timing out" interactions at either community or stand-alone gaming machines. This feature is especially advantageous any time the wagering game requires some form of player input. By making pre-determined selections at the beginning of the special event, the burden is placed on the player to either accept the pre-determined selection or make a different selection. If no action by the player occurs in a set amount of time, as described above, then the controller automatically assigns the player the pre-determined selection.

As mentioned above, the pre-set pick feature may be included in community or stand-alone gaming machines. These gaming machines include a wagering game that, in some aspect, involves a plurality of objects that are selectable by a player and that have an effect on the outcome. One of the plurality of objects is randomly pre-selected by a controller. The pre-selected object may be selected by the player or the player may make a different selection. If the player has not made a selection in a specified amount of time, the pre-selected object is selected for the player.

Also, while it has been discussed herein that the community controller 65 receives inputs for determining the best selection and/or makes selections via the auto-pick, pre-set pick and opt-out features, it is also possible to have one or more of the controllers 34 in the gaming machines 10_a-f_ perform these functions. This configuration may be referred to as the "master" and "slave" configuration such that one gaming machine (i.e., 10_a_) is the "master" that receives the inputs and transmits the information to the other gaming machines 10_b-f_ (i.e., the "slave" gaming machines).

Figure 9:
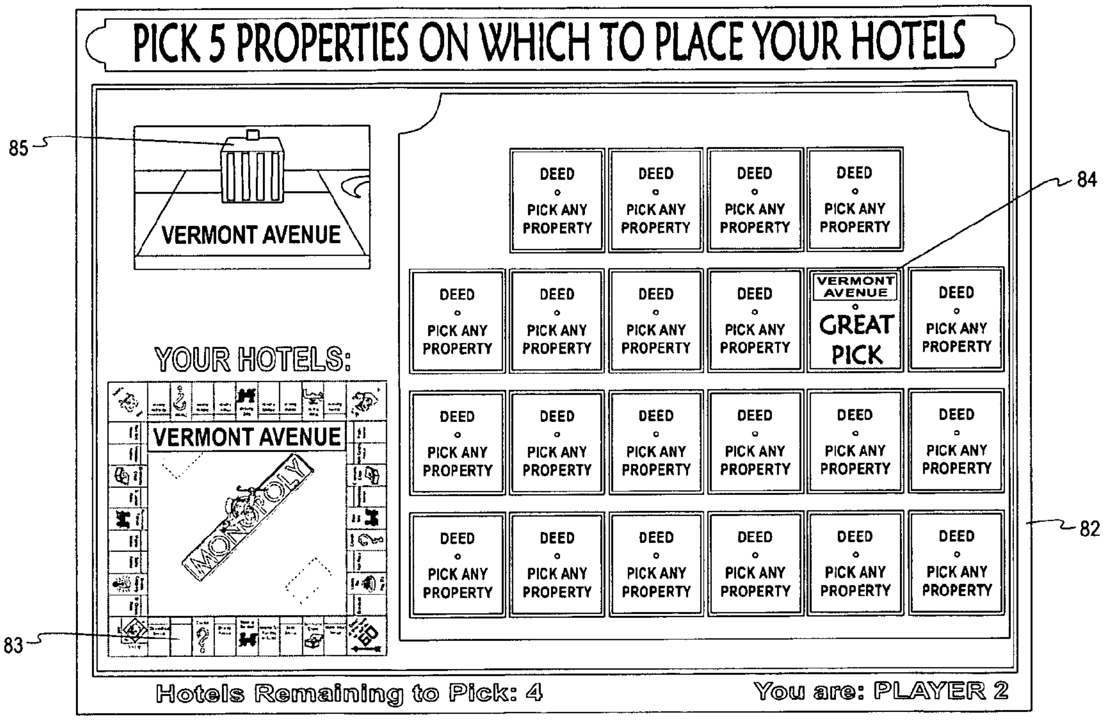
FIG. 9 is a view of a display displaying a bonus game having player-selectable objects according to one embodiment of the present invention.

The above features, particularly the best-selection feature, may be employed in a community wagering game as shown in FIGS. 9-12. In this embodiment, players who are playing the BIG EVENT MONOPOLY™ bonus game make selections of properties on which to place hotels 85. As illustrated in FIG. 9, players choose from a plurality of properties 82. The number of selections is determined by the best selection feature (i.e., five hotels in FIG. 5) and each player gets five selections from the plurality of properties 82. The identity of the properties 82 are initially unknown to the players and are then revealed upon selection. For example, in FIG. 9, "Vermont Avenue" has been selected as one of the selected properties 84. Once selected, a picture of the MONOPOLY™ board 83 may be displayed with the selected property delineated and/or with a hotel 85 placed on the property. Player 2 is then instructed that he or she has four more selections to make. Once the remaining selections are made by Player 2, the five hotels 85 are placed on the selected properties. The other players also make their five selections from the available display of properties 82.

Figure 10A:
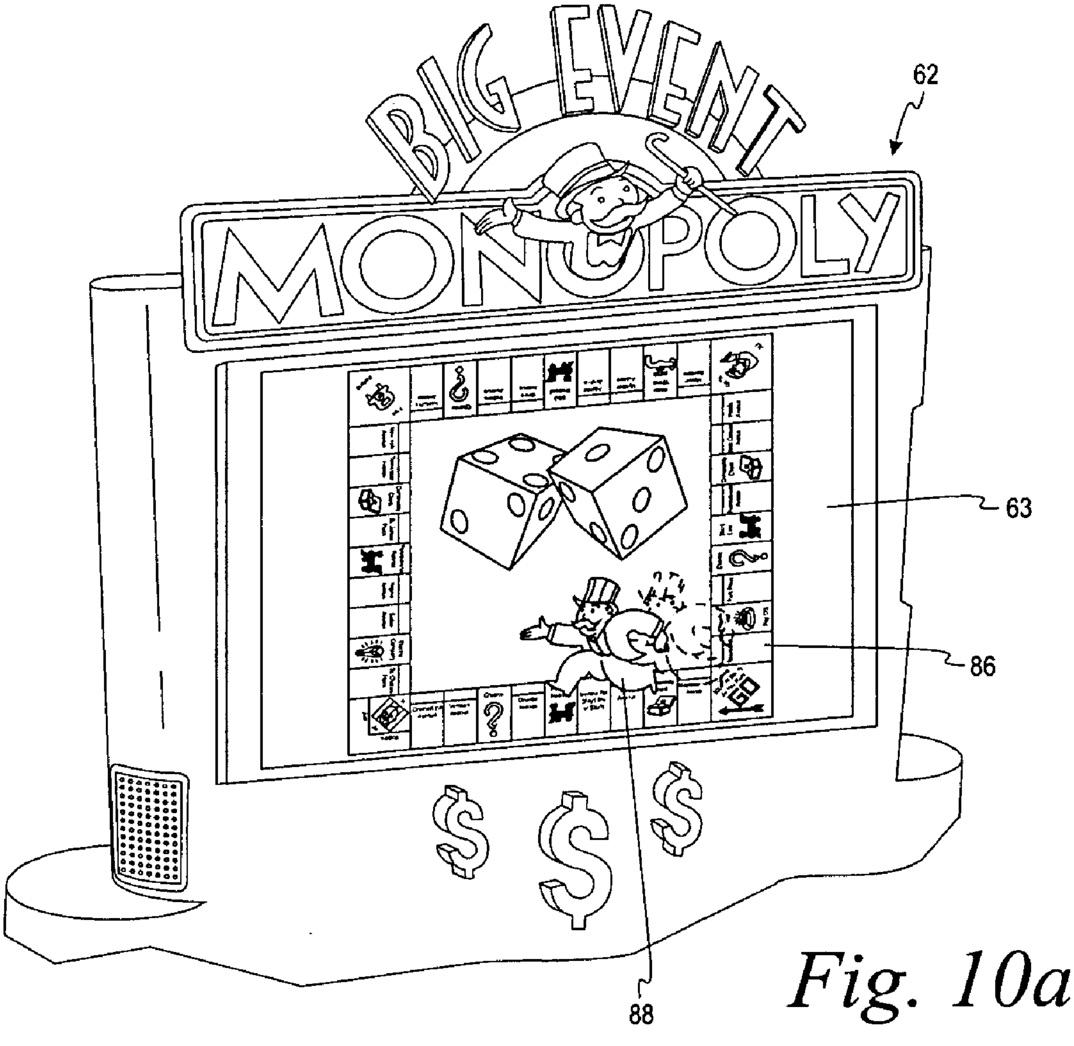
FIGS. 10-12 are views of a display displaying different features of a bonus game according to one embodiment of the present invention.
Figure 10B:
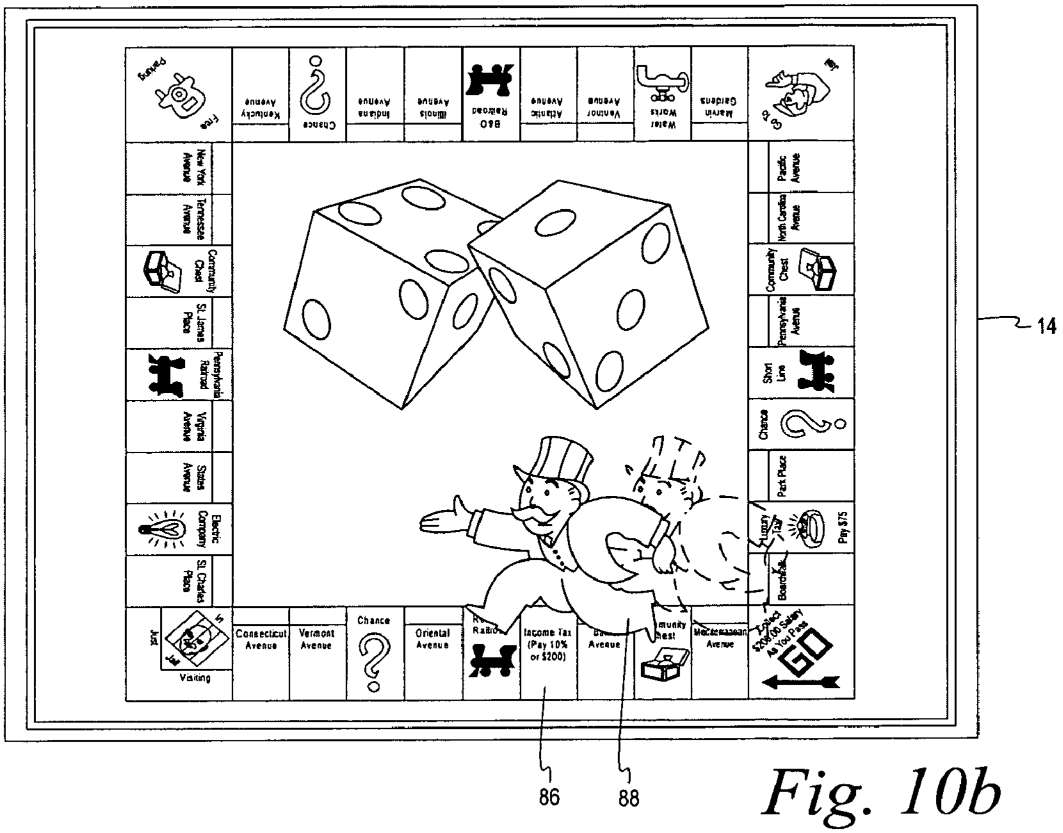

FIGS. 10*a* and 10*b* illustrate the BIG EVENT MONOPOLY™ game screen 63 as it may be displayed on signage 62 (FIG. 10*a*) or on a primary display 14 or secondary display 16 (FIG. 10*b*). In one embodiment, once the players have made their selections from the available properties, the BIG EVENT MONOPOLY™ game screen 63 displays a MONOPOLY™ game board 86 where a MR. MONOPOLY™ figure 88 starts at the "GO" space and travels around the game board 86. According to one embodiment, the figure 88 travels once around the board game 86 and stops on spaces or properties corresponding to a roll of two dice. The roll of the dice is controlled by the controller 65.

Figure 11:
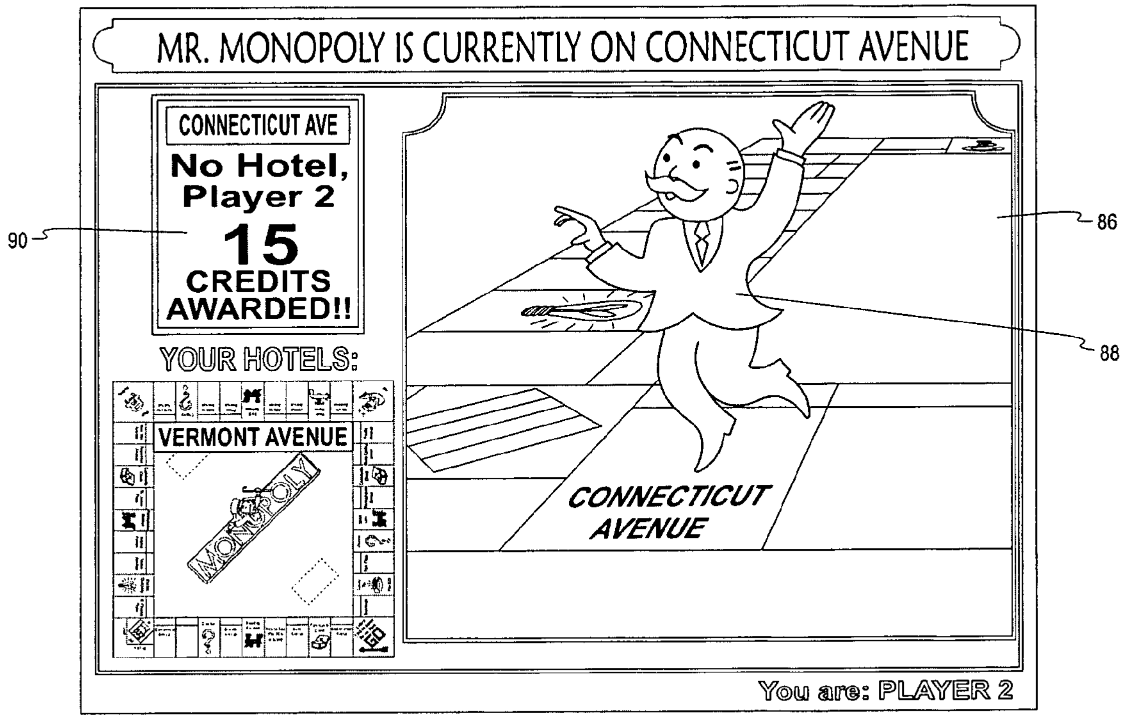
Figure 12:
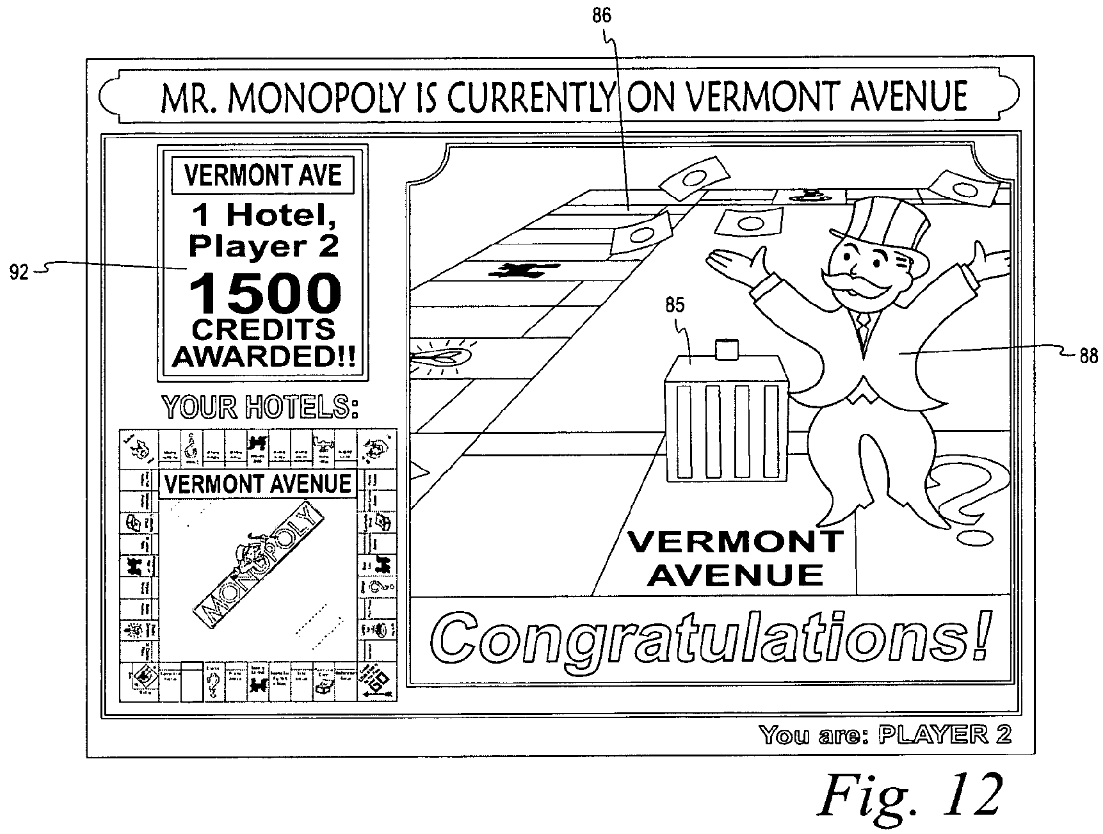

If the figure 88 lands on a property where a player has no hotel, the player or players get a smaller award 90, as shown in FIG. 11, i.e., a player is awarded 15 credits after the figure 88 lands on "Connecticut Avenue" that has no hotels. If the figure 88 lands on a property having a hotel 85, as shown in FIG. 12, then the player or players receive a larger award 92. For example, the player in FIG. 12 is awarded 1500 credits after the figure 88 lands on "Vermont Avenue" which has one hotel 85.

Other spaces on the game board 86 may be associated with additional awards. These awards may be awarded to only a single player or to all players of the BIG EVENT MONOPOLY™ game. For example, if the figure 88 lands on a "Community Chest" space, all players may receive a random credit award of a certain amount of credits.

According to one embodiment, the BIG EVENT MONOPOLY™ game ends when the MR. MONOPOLY™ figure 88 has completed one trip around the board and returns to the "GO" space. At this point, all players resume their individual games at each of the gaming machines 10*a-f*. The individual games will commence at the point that they left off to take part in the community game.

Other embodiments of the present invention that include the best selection feature may contain various types of selectable objects. The selectable objects may be displayed in any manner, shape or form. For example, one embodiment may contain oil rigs arranged in a field of oil wells. The field of oil wells is displayed to players playing a community wagering game, similar to the BIG EVENT MONOPOLY™ game described above. In this example, oil rigs are selected by players and the highest award associated with a selected oil rig can be awarded to all players via the best selection feature described herein. In some embodiments, the awards associated with the oil rigs may be cycled or distributed across the field of oil wells such that some oil rigs are associated with changing award amounts.

In another embodiment, players at linked gaming machines may select "virtual properties" that are part of a larger set of properties located in a particular state, i.e., California. Each selected virtual property may be associated with a number of "prospectors" that mine the virtual property. These prospectors may randomly award prizes, such as credits, modifiers of the base game, or assorted bonus rewards. During the play of the basic game at the linked gaming machines, a special-event outcome may occur that triggers a shared, community wagering game where all of the prospectors across all of the virtual properties start awarding prizes to the players. In accordance with the best selection feature of the present invention, the highest award of credits, modifiers, bonus rewards, etc., may be awarded to each of the players playing the community wagering game.

While the present invention has been described with reference to one or more particular embodiments, those skilled in the art will recognize that many changes may be made thereto without departing from the spirit and scope of the present invention. For example, awards that are received by players according to the present invention have been described herein in terms of non-monetary awards, i.e., free picks in a bonus game. It is also contemplated that monetary awards may be awarded to players in association with the best selection feature of the present invention.

Each of these embodiments and obvious variations thereof is contemplated as falling within the spirit and scope of the claimed invention, which is set forth in the following claims.

What is claimed is:

1. A gaming system for playing a community game comprising:

a plurality of linked gaming machines being operable to receive wagers from players, each machine including a display for displaying a plurality of objects, each of said plurality of objects being associated with an award, each of said awards being masked prior to selection;

wherein at least one of said plurality of objects is randomly pre-selected at each of said plurality of linked gaming machines by a controller, said controller providing said players with at least two options to select from during a fixed amount of time, said at least two options being to (i) accept said pre-selected object by said controller or (ii) select a different object via player selection, and wherein said object that is pre-selected by said controller is automatically selected after said fixed amount of time has expired; and wherein upon selection of at least one of said objects at each of said plurality of linked gaming machines, the award associated with said at least one selected object is revealed and the highest award associated with said selected objects is awarded to each of said gaming machines.

2. The gaming system of claim 1, wherein said selection of at least one of said objects is responsive to player input.

3. The gaming system of claim 1, wherein said community game is triggered by either a community controller or a special-event outcome at one of said plurality of linked gaming machines.

4. The gaming system of claim 1, wherein said pre-selected object is a known outcome.

5. The gaming system of claim 1, wherein said awards are non-monetary awards, said highest award providing a predetermined number of free picks in a bonus game.

6. The gaming system of claim 5, wherein said bonus game is displayed on a community display, and wherein after said bonus game is played, said players return to playing wagering games at said plurality of linked gaming machines.

7. A method of conducting a community wagering game via a plurality of linked gaming machines, each of said plurality of linked gaming machines being operable to receive a wager from a player, said method comprising:

displaying a plurality of selectable objects at said plurality of linked gaming machines, each of said plurality of selectable objects masking an award; and randomly selecting, via a controller, at least one of said plurality of selectable objects at each of said plurality of gaming machines, said controller providing each player of said plurality of gaming machines with at least two options, said at least two options being to (i) accept said random selection or (ii) select a different selectable object via player selection, said at least two options being provided during a fixed amount of time, and wherein said random selection is automatically selected and revealed after said fixed amount of time has expired without at least one of said players making any selection.

8. The method of claim 7, wherein said wagering game is a community wagering game including a plurality of linked gaming machines.

9. The method of claim 8, wherein said community game is triggered by either a community controller or a special-event outcome at one of said plurality of linked gaming machines.

10. The method of claim 8, further comprising providing an option of selecting a known special-event outcome instead of participating in said community game.

11. The method of claim 8, further comprising achieving a start-community-game outcome at said one of said plurality of linked gaming machines, said start-community-game outcome triggering a special event including said act of selecting from said selectable objects.

12. A gaming system for playing a community game comprising:

a plurality of linked gaming machines;

a controller coupled to said plurality of linked gaming machines and operative to receive a special-event-triggering signal associated with a special event in response to a special-event outcome being achieved;

transmit a special-event-play signal to said plurality of linked gaming machines to randomly pre-select, via the controller, one of a plurality of masked objects on each of said plurality of gaming machines, said controller providing players of said linked gaming machines with at least two options to select from during a fixed amount of time, said at least two options being to (i) accept said pre-selected object by said controller or (ii) select a different object via player selection, and wherein said object that is pre-selected by said controller is automatically selected after said fixed amount of time has expired, each of said plurality of objects being associated with an award;

reveal the award associated with said selected objects on each of said plurality of gaming machines;

determine which of said selected objects on each of said plurality of gaming machines is associated with an award that is better than the least favorable award obtained; and award said better award to each of said players at said plurality of linked gaming machines.

13. The gaming system of claim 12, wherein said awards are non-monetary awards, said better award providing a predetermined number of free picks in a bonus game.

14. The gaming system of claim 12, wherein said better award is the highest award of said obtained objects.

15. The gaming system of claim 1, wherein said pre-selected object is highlighted.

16. The method of claim 7, further comprising highlighting said random selection.

17. The gaming system of claim 12, wherein said pre-selected object is highlighted.

* * * * *